United States Patent [19]
Steiner

[11] 3,814,535
[45] June 4, 1974

[54] BACK SPOTFACING AND COUNTERBORING TOOL

[75] Inventor: Rudolph Steiner, Fairport, N.Y.

[73] Assignee: Numertap, Inc., East Rochester, N.Y.

[22] Filed: Feb. 7, 1973

[21] Appl. No.: 330,304

[52] U.S. Cl................... 408/73, 408/147, 408/152, 408/187, 408/199
[51] Int. Cl............................................ B23b 51/00
[58] Field of Search............ 408/73, 147, 148, 150, 408/152, 187, 199, 224, 227

[56] References Cited
UNITED STATES PATENTS
3,540,324  11/1970  Johansson............................ 408/227

*Primary Examiner*—Gil Weidenfeld

[57] ABSTRACT

A spotfacing cutter is pivotal into and out of a recess in a tool shank by a hinge pin which is journaled in the shank. An activating ring, which is mounted for limited rotation on the shank, is connected with the hinge pin. An annular friction pad is interposed between the activating ring and a pilot sleeve which surrounds the shank. A braking surface is formed on the pilot sleeve or friction pad to be urged into engagement with the bore of a workpiece to brake the rotation of the activating ring relative to the shank so that the cutter will be moved to cutting position or retracted therefrom merely by simultaneously reversing rotation of the shank and braking the activating ring. The cutter can be passed through a bore of a workpiece while it is retracted; and the shank can then be reversed to extend the cutter into cutting position so as to back spotface the bore. Then the spindle can be reversed again, and the tool can be withdrawn through the bore.

15 Claims, 8 Drawing Figures

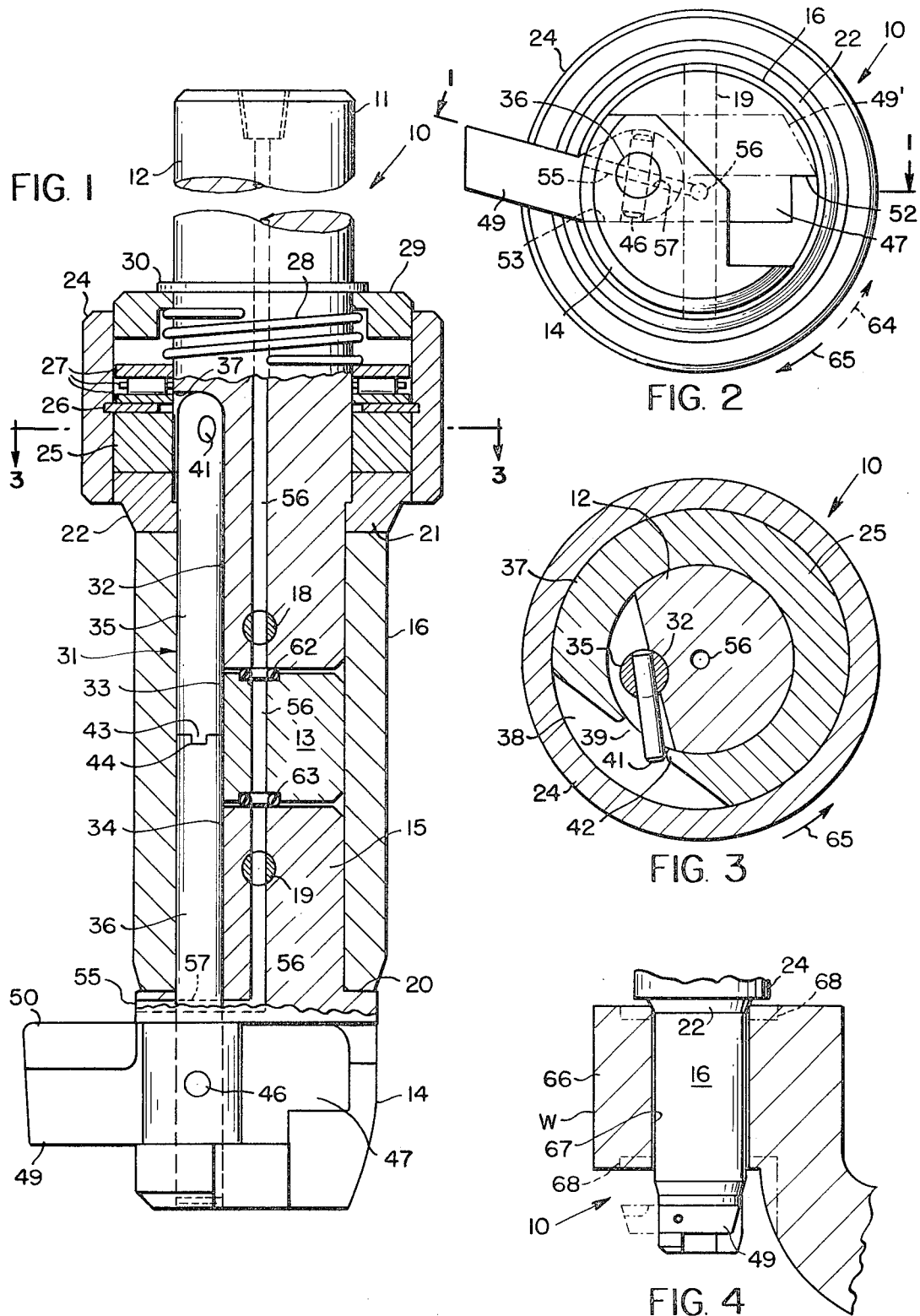

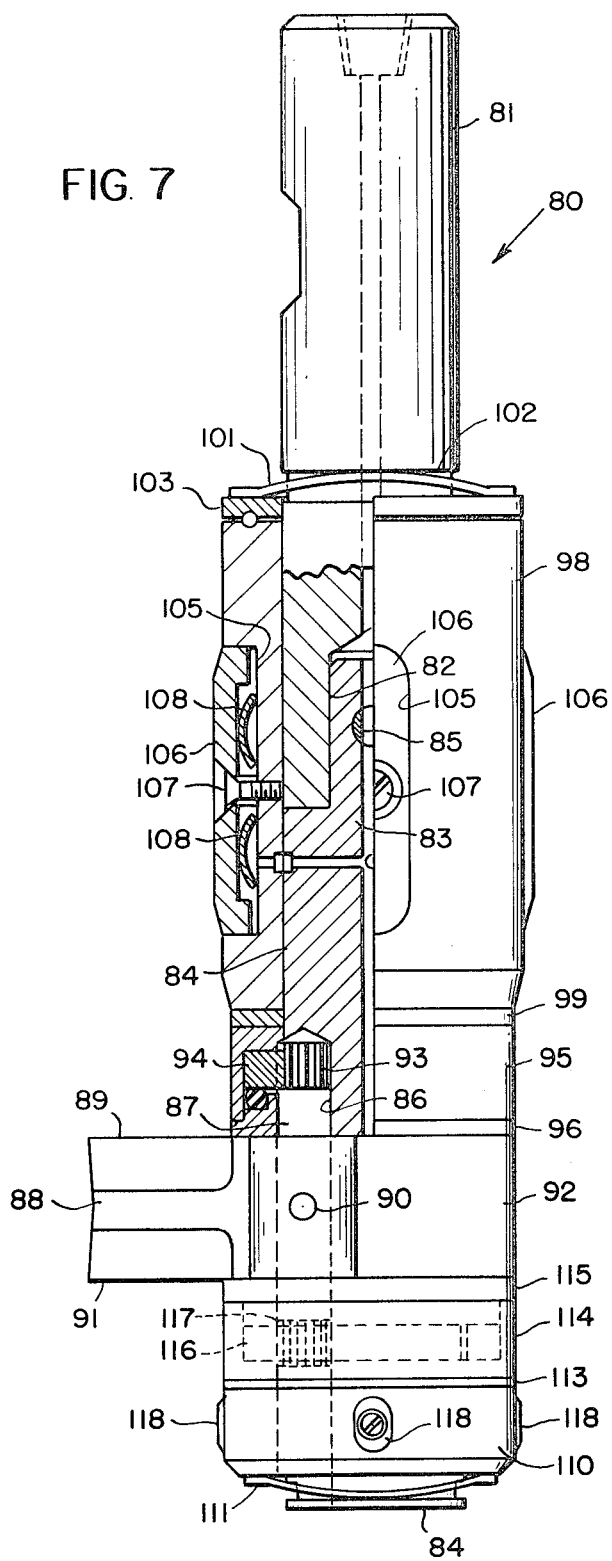
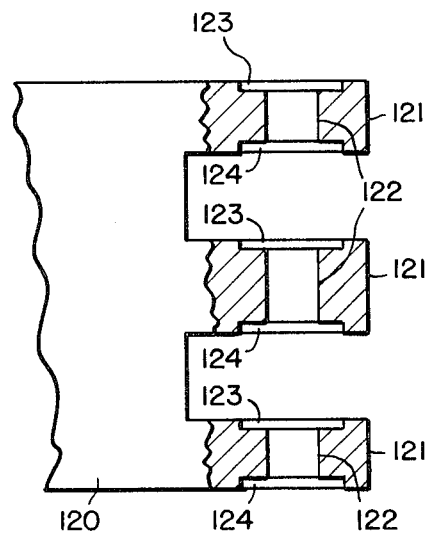
FIG. 7
FIG. 8

BACK SPOTFACING AND COUNTERBORING TOOL

This invention relates to a cutting tool, and more particularly to a retractable spotfacing or counterboring tool.

Back spotfacing operations can be performed by rechucking the workpiece with the surface, that is to be spotfaced, in operative relation to the tool and counterboring. Where the surface, which is to be spotfaced is relatively inaccessible to an ordinary counterboring tool, and for more sophisticated spotfacing operations, holders are designed which carry a retractable tool bit, and this is passed through a bore in a workpiece while the bit is retracted and thereafter the bit is shifted radially outwardly of the holder to an operative position by manually operable camming means or the like; and then the holder is retracted to draw the bit into cutting relation to the underside of the workpiece to effect spotfacing.

Rechucking of the work after operation on one side surface to effect backfacing has the obvious disadvantages of being extremely time-consuming; while tools employing retractable, cam-operated bits are usually complicated and expensive to manufacture, and are subject to frequent breakdowns.

A primary object of this invention, is to obviate the need for a complex camming mechanism and instead to provide a much simpler retractable tool holder than has heretofore been built. To this end it is an object also to provide an improved spotfacing and counterbore tool having a bit which can be moved between its retracted and extended position merely be reversing the rotation of the tool spindle.

Another object of this invention is to provide an improved tool of the type described in which the bit can be readily changed.

A further object of this invention is to provide a tool of the type described which has means for automatically disconnecting the tool bit from its drive spindle in the event the bit is subjected to an excessive axial load during use.

A still further object of the invention is to provide a tool holder having a single double-edged tool, which can be selectively positioned for both counterboring and spotfacing.

Still another object of this invention is to provide a tool of the character described with simple means for supplying coolant to a tool bit during cutting.

Other objects of the invention will be apparent hereinafter from the specification and from the recital of the appended claims, particularly when read in conjunction with the accompanying drawings.

In the drawings:

FIG. 1 is a fragmentary elevational view of a back spotfacing and counterboring tool made according to one embodiment of this invention, the retractable bit of the tool being shown in its extended or operative position, and portions of the tool being shown in section on a plane taken generally along the line 1—1 in FIG. 2;

FIG. 2 is a bottom plan view of this tool;

FIG. 3 is a sectional view taken along the line 3—3 in FIG. 1 looking in the direction of the arrows, but showing the bit in its retracted position;

FIG. 4 is a fragmentary sectional view of a workpiece about to be spotfaced by this tool;

FIG. 7 is an elevational view, partially in section, of still another embodiment of the invention; and FIG. 8 shows, partly in section, a workpiece having therethrough a plurality of axially aligned bores, both ends of which can readily be counterbored and spotfaced with the tool shown in FIG. 7.

Figure 5:
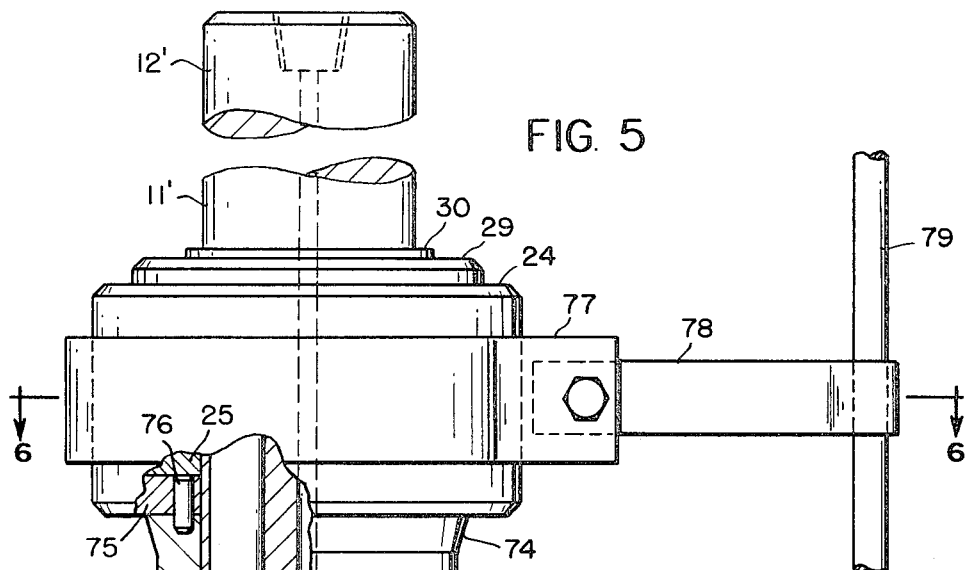
FIG. 5 is a fragmentary elevational view of a modified back spotfacing and counterboring tool made according to a second embodiment of this invention, portions of the tool being broken away and shown in section.

Referring now to the drawings by numerals of reference, and first to the embodiment illustrated in FIGS. 1 to 3, 10 denotes generally a back spotfacer and counterbore having a three-piece drive shank 11 comprising an upper, shank section 12, center section 13, and a lower section 14. The shank extends coaxially through the bore of pilot sleeve 16 with section 13 positioned in the sleeve between the lower end of section 12 and the reduced diameter portion 15 of section 14, which projects coaxially into the lower end of the sleeve. Sections 12 and 14 are secured to the sleeve 16 by spaced, parallel shear pins 18 and 19 (FIG. 1), which extend through section 12 and portion 15, respectively, into the sleeve. The lower end of sleeve 16 abuts a shoulder 20 that is formed at the juncture of the reduced diameter and enlarged diameter portions of spindle section 14; and the upper end of the sleeve is seated against the underside of an annular friction pad 21, which surrounds the shank section 12.

Pad 21 has a conical outer peripheral portion 22 (FIGS. 1 and 2), which tapers downwardly toward the outer periphery of sleeve 16; and the cylindrical upper end of the pad extends slidably into an actuating ring 24, which projects above the pad in radially spaced relation to shank 12. Mounted coaxially in the bore of ring 24 on top of pad 21 for limited rotational and axial movement on shank 12 is an activating ring 25. This ring is seated beneath a retaining washer 26, which is fixed in an annular groove in the bore of ring 24 to be slidable axially with the ring relative to shank 12. Seated on top of washer 26 in ring 24 also for axial sliding movement on shank 12 is a conventional antifriction needle bearing 27. A coiled compression spring 28, which surrounds the shank 12 above bearing 27, is seated at its lower end against the bearing, and at its upper end against an annular cover 29, which is slidably mounted in the upper end of ring 24 beneath a retaining ring 30, which is fastened around the shank 12 above cover 29 to prevent upward movement of the cover on the shank.

Spring 28 thus urges bearing 27 downwardly so that under normal circumstances any rotation imparted by shank 11 to the sleeve 16 will also be imparted through friction pad 21 to the activating rings 25 and 24.

A hinge pin 31 made in two interconnected parts 35 and 36 (FIG. 1) is mounted for limited pivotal movement in axially-aligned bores 32, 33 and 34 formed in shank sections 12, 13 and 14, respectively, in radially offset relation to the shank axis. Hinge pin 31 is offset from but parallel to shank 11. The bores 33 and 34 extend completely through their respective shank sections 13 and 14; but the bore 32 extends only part way into the lower end of shank 12. At its upper end bore 32 opens on a chordal notch or slot 37 (FIGS. 1 and 3), which is formed in one side of shank 12 to register with a slot 38 formed in activating ring 25. An opening 39 connects slots 37 and 38. Adjacent its upper end hinge pin 31 carries a small, activating pin or lever 41, which projects at its free end through the opening 39 into slot 38 to engage the shouldered ends of opening 39 to be pivoted thereby in opposite directions to move hinge pin 31 in opposite directions upon movement in opposite directions, respectively, of ring 25 relative to shank 12. Hinge pin section 35 is releasably and drivingly coupled to hinge pin section 36 by a tongue 43, which projects into a registering groove 44 in the upper end of pin section 36.

Releasably secured at one end by a pin 46 to hinge pin section 36 for radial swinging movement thereby in a transverse slot 47 in the lower end of shank section 14 is a tool bit 49. Cutter 49, which has the usual carbide cutting tip 50, is disposed to be swung horizontally between a retracted position as denoted by broken lines at 49' in FIG. 2, and an extended or operative position as shown by full lines in FIGS. 1 and 2. In its retracted position the cutter 49 seats against a shoulder 52 (FIG. 2) formed on section 14 at one side of slot 47; and in its operative position the cutter engages a plane surface 53 that is formed on section 14 at the back of slot 47 to hold the bit against further counter-clockwise rotation about the axis of the hinge pin.

When the bit 49 is in its operative position, its cutting edge is just below the outer end of a radial port or duct 55 (FIGS. 1 and 2), formed in the shank section 14 above slot 47. Duct 55 then communicates through a duct 57 in hinge pin section 36 with an axial bore 56, which extends through shank 11 and shear pins 18 and 19, so that a liquid coolant can be fed through the center of shank 11 to the cutting edge of the bit 49 when the bit is in its operative or cutting position. Resilient O-rings 62 and 63 are seated in recesses in opposite ends of the center section 13 of the shank to prevent the coolant from leaking between the separate sections of the shank.

For use, the tool shank 12 is chucked in or otherwise secured to the reversible driving arbor or spindle of a drill press, or the like, so that rotation of the shank will be transmited through the hinge pins 35 and 36 to spindle sections 13 and 14, and by shear pins 18 and 19 to pilot sleeve 16. Normally the compression spring 28 causes this rotation to be imparted to the friction pad 21, the activating ring 25, and outer ring 24.

At the start of an operation the cutter 49 is in its inoperative position 49' (FIG. 2), wherein it lies entirely within an imaginary cylinder defined by the outer peripheral surface of the pilot sleeve 16, so that it will not interfere with passage of the pilot sleeve through the bore in a workpiece.

In FIG. 4 W denotes a workpiece having a flange 66 with a bore 67 which is slightly larger in diameter than the outside diameter of pilot sleeve 16. To back spotface or counterbore the lower end of bore 67, the drill press is first operated to drive spindle 11 counter-clockwise about its axis as indicated by arrow 64 in FIG. 2, so that the friction pad maintains bit 49 in its inoperative position. The drill spindle is lowered to pass the tool through bore 67 until bit 49 has passed beneath flange 66, and the tapered surface 22 on friction pad 21 has been forced into engagement with the upper end of the bore. The direction of rotation of the tool 10 is then reversed. The pressure of the work W against the pad 21 then forces the pad upwardly, together with rings 25 and 24 against the resistance of compression spring 28, thereby holding pad 21 and ring 25 frictionally while shank 12 continues to rotate in the direction of the arrow 65 in FIGS. 2 and 3. The pin 41, and consequently the hinge pin 31, are thus pivoted by the side 42 of opening 39 in the activating ring 25, as shown in FIG. 3, until stopped by engagement of pin 41 with the opposite end of the slot 37 in shank 12. This pivots the cutting bit 49 to its operative position, as illustrated by solid lines in FIGS. 1 and 2. The drill spindle is then retracted to cause the cutting bit to counterbore as denoted in broken lines at 68 (FIG. 4). During this movement the friction pad 21 is disengaged from the work W so that the spring 28 urges rings 24 and 25 and pad 21 back to their original positions, wherein the pad 21 and ring 25 are compressed against the upper end of the pilot sleeve 16 to rotate therewith, and to hold the activating pin 31 frictionally in its bit-actuating position.

After the bit 49 has cut the counterbore to the desired depth, the operator reverses the direction of rotation of the drill spindle and momentarily reengages pad 21 with the upper end of bore 67 so that the tool bit 49 is swung back to its retracted position. Then the tool may be withdrawn from the work.

If during the above operation an excessive load is applied to bit 49, the shear pin 18 or 19 will fail, thereby permitting lower section 14 and bit 49 to drop downwardly in the pilot sleeve 16, perventing damage to the tool.

Figure 6:
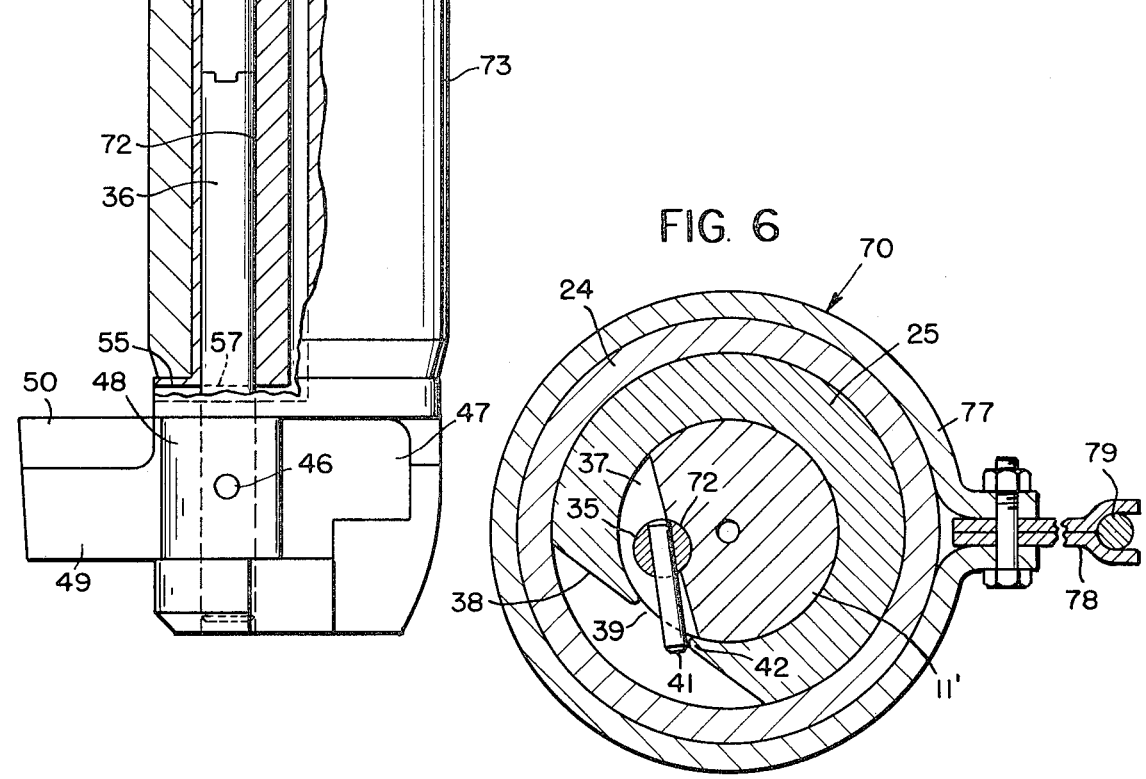
FIG. 6 is a fragmentary sectional view of this modified tool taken along the line 6—6 in FIG. 5, but with the tool bit disposed in its retracted position.

Referring now to the modified tool 70 shown in FIGS. 5 and 6, 12' denotes a solid, one-piece shank 11' having in its lower end the notch or recess 47 for accommodating a tool 49 of the type disclosed in the first embodiment. Also as in the first embodiment, the cutter 49 is secured by a pin 49 to the lower end of a two-piece hinge pin 35, 36, which is mounted for pivotal movement in an axially extending bore 72 formed in the lower end of the shank 11' in parallel, offset relation to the axis of the spindle.

In this second embodiment, however, the shank 11' is mounted in a modified pilot sleeve 73, which is rotatable on the shank and which has at its upper end an integral conical activating surface 74. Sleeve 73 is connected by a plurality of dowels or pins 76 to an annular friction pad 75 that is disposed in the lower end of sleeve 24 beneath an activating ring 25 of the type used in the first embodiment. Also as in the first embodiment, ring 25 is urged resiliently into frictional contact with the pad 75 by a compression spring (not illustrated), which surrounds shank 12' beneath a cover 29 that is held in the upper end of sleeve 24 by a lock ring 30.

Another feature of this second embodiment is that a ring clamp 77 may be secured in any conventional manner around the sleeve 24 on shank 12', and to one end of a yoke 78. The opposite end of the yoke may be slidably connected to a stationary operating rod 79 that projects downwardly from the frame of the machine on which the tool 70 is mounted, thereby to permit the tool to be shifted vertically relative to rod 79, while holding the yoke 78 and sleeve 24 against rotation with the spindle 11'.

Tool 70 can be operated either with or without the yoke 78. When the yoke is not used, the tool 70 is chucked in the spindle, and with its bit 49 in its collapsed position in recess 47, is lowered through the bore in a workpiece until the bit passes beneath the work. Then the drive to the tool shank 12' is reversed, and the tool 70 is lowered until the shoulder 74 on sleeve 73 engages the upper end of the bore in the work momentarily to stop rotation of sleeve 73. The shank 12', on the other hand, continues to rotate, and this causes the tool bit 49 to be swung outwardly to its active position as shown in FIG. 5. The counterboring operation is then effected as described in connection with the first embodiment of the invention.

After counterboring the rotation of the shank 12' is once again reversed so that the bit is again retracted.

Instead of relying upon the shoulder 74, the yoke 78 may be attached by ring clamp 77 to the sleeve 24 and to the rod 79. Then, when the shank 11' is rotated (clockwise in FIG. 6), cutter holder 49 is retracted; and when the shank rotation is again reversed, the cutter is swung to operating position. The rod 79 and yoke 78 momentarily hold the activating ring 25 against rotation with the shank 11', upon each reversal of the direction of rotation of the spindle. Hence, the tool bit 49 can be swung to retracted or extended position merely by reversing the direction of rotation of the shank 11', without necessitating engagement of the tapered activating surface 74 on the pilot sleeve with the work itself.

In FIG. 7, 80 denotes a tool built according to still another modification of the invention. In this embodiment the shank 81 of the tool spindle has in its lower end a blind bore 82 in which the upper, reduced diameter end 83 of a tool body 84 is secured by a radial shear pin 85. Rotatably mounted in an axially extending bore 86 in the lower end of body 84 in radially offset relation to the spindle axis, is an elongate hinge pin 87. A double-edged tool bit 88, having upper and lower edges 89, 91 is secured at its inner end by a pin 90 to the hinge pin 87 for pivotal movement thereby into and out of a transverse recess or pocket 92 formed in the side of body 84 adjacent its lower end. A pinion 93, which is secured on the upper end of pin 87, meshes with an internally toothed ring gear 94 that surrounds section 84 above tool bit 88. Ring gear 94 is secured in a recess in the lower end of a rotatable activating ring 95, which surrounds the spindle body 84 above bit 88. Gear 94 rotates on a antifriction bearing 96, which is secured to the spindle body 84 to project into the lower end of ring 95 coaxially thereof.

Above ring 95 the interconnected ends of the spindle body 84 and spindle shank 81 are surrounded coaxially by a back pilot sleeve 98, the lower end of which is seated upon an annular friction ring 99, which surrounds the spindle body 84 between ring 95 and sleeve 98. A Bellville type spring 101 is secured in annular recess 102 in shank 81 to engage an antifriction bearing 103, which is mounted on the upper end of sleeve 98 to urge the sleeve axially downwardly on the spindle against friction bearing 99 and activating ring 95.

Mounted for limited radial movement in four equi-angularly spaced recesses 105 in the outer periphery of sleeve 98 are four, spring-loaded pressure pads 106, which normally project slightly radially beyond the outer periphery of sleeve 98. Each pad 106 is held by a set screw 107 and spring-pressed outwardly by a pair of leaf springs 108 that are housed in each recess 105.

Rotatably mounted on the lower end of the shank extension 84 coaxially thereof is a front pilot sleeve 110, which is similar in construction to, but much less in length than the back pilot sleeve 98. A spring type retaining ring 111, which is secured in an annular recess in the lower end of the shank body 84 urges pilot sleeve 110 axially upwardly against an annular friction bearing 113, an activating ring 114 that is similar to ring 95, and an antifriction bearing 115. Parts 113, 114, 115 are mounted in axial alignment one above another on the shank body 84 between the front pilot 110 and the pivotal tool bit 88. As in the case of ring 95, ring 114 carries an internal gear 116 which meshes with the teeth of another pinion 117, which is formed on the lower end of the hinge pin 87. Also as in the case of the back pilot sleeve 98, the front pilot sleeve 110 carries in four equi-angularly spaced recesses in its outer periphery a plurality of spring-loaded pressure pads 118, which normally project slightly beyond the outer peripheral surface of the sleeve 110 in a manner similar to the pressure pads 106.

The tool 80 is particularly suited for spot facing or counterboring both the front and back surfaces of a workpiece of the type denoted, for example, at 120 in FIG. 8. This workpiece has spaced, parallel lugs 121, each having therethrough three axially aligned bores 122, opposite ends of which are to be counterbored at 123 and 124, respectively. Each bore 122 has a diameter slightly less than the diameter of a cylinder developed by the outer surfaces of pressure pads 106 and 118 carried by tool 80.

In use, the shank 81 of the tool is chucked to the driving spindle of a drill press, or the like. Assuming that the bit 88 is in retracted position, the tool is rotated in a direction in which the friction between the bore in the workpiece and the spring-loaded pilot pads maintains the tool 88 closed; and it may be lowered successively through the aligned bores 122 in the work until the bit 88 has passed beneath the lowermost lug 121. During the passage of the pilot sleeves 110 and 98 downwardly through the bores 122, the pressure pads 118 and 106 thereon frictionally engage the bore walls to stop rotation of the pilot sleeve. In turn the friction bearings 113 and 99 tend to halt the rotation of the activating rings 114 and 95, and the ring gears 116 and 94 carried thereby. The shank 81 and shank body 84, however, continue to rotate so that the pinions 117 and 93 drive the ring gears 116 and 94 in directions which tend to hold the bit 88 in retracted position.

After the tool bit 88 is beneath the work, the direction of rotation of the drive spindle is reversed. At this time the pressure pads 106 on the back pilot sleeve 98 are frictionally seated in the bore 122 in the lowermost lug 121 of the workpiece, so that as the shank 81 and shank body 84 begin to rotate in the opposite direction, the pinion 93 begins to rotate on the now-stationary ring gear 94 in a direction to swing the bit 88 outwardly to its open or cutting position as shown in FIG. 7. When the bit 88 is fully open, the tool 80 is elevated to bring the upper cutting surface 89 on the bit 88 into cutting engagement with the lower end of the bore 122 in the lowermost lug 121 of the workpiece to cut therein the lowermost counterbore 124.

When this counterbore has been completed, the shank drive is reversed to rotate shank 81 and the body 84 in the opposite, or bit-closing direction. The pressure pads 106 through frictional engagement with the lowermost bore wall halt the rotation of the sleeve 98, so that the rotating shank 81 and shank body 84 cause the pinions 93 and 117 to rotate back along the gears 94 and 116 in a direction to swing the bit 88 into retracted position. Thereafter the tool 80 can be raised far enough to bring the bit 88 into the space between the lowermost and middle lugs 121 of the workpiece. At this time the sleeve 98 or 110 will be disposed in the bore 122 of the middle or lowermost lug 121 of the workpiece; and the drive spindle rotation is once again reversed to rotate spindle 84 in a bit-opening direction, so that the bit 88 once again is swung to cutting position (FIG. 7). The tool 80 is then lowered slightly to engage the lower cutting edge 91 on the bit 88 with the upper end of the bore 122 in the lowermost arm 121 to cut therein the counterbore 123, after which the tool 80 can be elevated slightly so that its edge 89 will cut the counterbore 124 in the lower end of the bore 122 in the middle arm 121 of the workpiece.

In a manner that will be apparent from the above description, the tool 88 can be manipulated alternately to open and close the cutting bit 88 to complete cutting the other counterbores 123 and 124 in the work.

From the foregoing it will be apparent that the instant invention eliminates the need for employing complicated and expensive camming mechanisms for swinging the cutting bit of a tool of the type described between its operative and retracted positions for the back and front spotfacing of a workpiece. By employing frictional activating surfaces at the outer peripheries of the pilot sleeve, it is possible to manipulate the tool bit merely by shifting the tool axially into and out of operative engagement with the work, while selectively reversing the rotation of the tool. The cutter will open or retract into the cutter head on demand, simply by reversing the rotation of the machine spindle. The invention not only extremely simplifies the tool construction, but also enables the tool to reach through a bore of almost any length without affecting the rigidity of the tool. The novel tools can be used to back-counterbore work to any depth and any shape such as, for example, valve seats, etc. Moreover coolant can be fed directly to the cutter through the axial bore in the spindle shank, whether it be a one-piece shank or a multi-piece shank. Furthermore, the bit is safeguarded against axial overload by use of shear pins. Still another advantage is that the cutting bits can be readily removed and replaced merely by removing the pins 46 and 90 and then withdrawing the lower hinge pin 36 or pin 87 from the bits and out of the bores 34 or 86 in the associated spindle bodies. For this purpose the hinge pin 35, 36, for example, comprises two parts coupled by a tongue and groove connection so that the lower section 36 can be removed without disturbing the upper section 35.

Further than this, tools of the type made in accordance with the instant invention require very little space for accommodating their activating members, and readily apply themselves both to manual and automatic operations. In the case of tool 80, for example, the only members projecting beyond the outer periphery of the pilot sleeves are the pressure pads 106 and 118, so that, by properly selecting the axial length of the shank 81 and associated pilot sleeves, long interrupted cuts are possible along side of walls or spherical or cylindrical surfaces.

While the invention has been described in connection with everal different embodiments thereof, and various uses therefor, it will be understood that it is capable of further modification and use; and this application is intended to cover any modifications and uses of the invention which come within its scope or the recital of the appended claims.

Having thus described my invention, what I claim is:

1. A tool comprising
   a shank attachable at its upper end to a machine tool spindle for reversible rotation, and for axial movement through a bore in a workpiece,
   a cutter movably mounted on said shank adjacent its lower end for movement between an inactive position within a recess in said shank, and an active position in which it projects laterally from said shank into cutting position,
   an activating member mounted on said shank for movement therewith, means limiting rotational movement of said member between first and second limit positions, respectively,
   means connecting said activating member to said cutter to effect movement thereof between its active and inactive positions upon rotation of said member between its first and second limit positions, and friction means resiliently coupling said activating member to said shank normally to resist relative rotation therebetween, and operable each time the direction of rotation of said shank is reversed to rotate said activating member from one to the other of its limit positions.

2. A tool as defined in claim 1, wherein said friction means comprises
   a pilot member surrounding said shank to guide said shank through a bore in a workpiece,
   a friction member surrounding said shank between said activating member and said pilot member and having one side thereof frictionally and resiliently engaged with said activating member normally to rotate therewith when said shank is rotating,
   one of said pilot and friction members having thereon an activating surface engageable with a workpiece to halt rotation of said one member, when said pilot member is inserted a predetermined distance into the bore of the workpiece, and
   said friction member being operative momentarily to brake the rotation of said activating member, when the rotation of said one member is halted, thereby to effect movement of said activating member to one of its limit positions.

3. A tool as defined in claim 2, wherein
   said connecting means comprises a shaft mounted in said shank for pivotal movement by said activating member about an axis parallel to the axis of rotation of said shank, when said activating member is rotated relative to said shank, and
   said cutter is connected to said shaft for pivotal movement thereby into its inactive position to enable passage of said one member into a bore in a workpiece to engage said activating surface with the workpiece.

4. A tool as defined in claim 3, wherein
   said activating member is a ring rotatably surrounding said shank and said shaft above said pilot member, and having therein a radial slot that opens on a transverse slot formed in one side of said shank, and said shaft projects into said transverse slot in said shank and carries a pin having a free end that projects radially through said transverse slot in said shank and into said radial slot in said ring to be pivoted by said ring between opposite ends of the slot in said shank, when said ring is rotated on said shank between its active and inactive positions, thereby to impart pivotal movement to said shaft.

5. A tool as defined in claim 4, wherein
said friction member is a second ring rotatably mounted on said shank between said pilot member and said activating ring,
said pilot member is secured to said shank to rotate therewith,
resilient means is interposed between said shaft and said rings to urge said rings resiliently axially toward said pilot member normally to rotate therewith, and
said activating surface comprises an inverted, conical surface formed on the outside of said second ring and projecting beyond the outer periphery of said pilot member to engage a workpiece when said pilot member has been inserted to a predetermined depth in a bore in said workpiece.

6. A tool as defined in claim 4, wherein
said pilot member is a sleeve rotatably mounted on said shank,
said friction member is a second ring rotatably mounted on said shank between said activating ring and the upper end of said sleeve normally to transmit the rotation of said shank to said sleeve, and
said activating surface comprises an inverted, conical surface formed on the upper end of said sleeve and projecting beyond the outer surface thereof for engagement with a workpiece, when the sleeve has been lowered a predetermined distance into a bore in the workpiece.

7. A tool as defined in claim 6 including
a second sleeve surrounding said second ring and frictionally engaged therewith, and
means for securing said second sleeve against rotation during rotation of said shank, whereby said activating ring is rotated from one to the other of its limit positions each time the direction of rotation of said shank is reversed.

8. A tool as defined in claim 3, wherein
said pilot member is a sleeve rotatable on said shank above said cutter,
said activating member is a ring rotatable on said shank adjacent one end of said sleeve and having thereon a plurality of gear teeth drivingly engaged with cooperating teeth on said shaft to impart pivotal movement to said shaft upon rotation of said activating ring relative to said shank,
said friction member is a second ring interposed between said sleeve and said activating ring normally to impart the rotation of said shank to said sleeve, and
said activating surface comprises at least one resilient pad carried by said sleeve and projecting radially beyond the outer periphery of said sleeve for frictional engagement with the bore in a workpiece upon insertion of said sleeve into the last-named bore, thereby to halt rotation of said sleeve with said shank, momentarily to cause relative rotation between said activating ring and shank.

9. A tool as defined in claim 8, wherein
a second pilot sleeve is rotatably mounted on said shank beneath said cutter
a second activating ring surrounds said shank adjacent one end of said second sleeve and has on its periphery a plurality of gear teeth drivingly engaged with a second plurality of cooperating gear teeth on said shaft to impart pivotal movement thereto,
a second friction ring is interposed between the second activating ring and second pilot sleeve, and
said second sleeve carries at least one resilient pad having thereon said activating surface, which is engageable with a bore wall in a workpiece to halt rotation of said second sleeve to effect movement of said cutter to one of its limit positions, when said second sleeve is inserted into the bore of a workpiece, whereby said first and second sleeves, selectively, may be used to swing the cutter between its operative and inoperative positions.

10. A tool, comprising
a shank attachable to the spindle of a machine tool for rotation and axial movement thereby,
a pilot sleeve surrounding said shank,
a shaft rotatably mounted in an axially extending bore in said shank, means restricting rotation of said shaft between first and second limit positions,
a cutter, means connecting said cutter to said shaft for pivotal movement thereby into and out of a recess in said shank between inactive and active positions, respectively,
an activating ring, means mounting said ring for limited rotational movement on said shank and said ring being connected to said shaft to pivot said shaft upon rotation relative to said shank,
resilient means interposed between said ring and said shank normally to resist relative rotation therebetween,
said resilient means including a friction pad surrounding said shank between said sleeve and said activating ring frictionally to couple said activating ring to said pilot sleeve to transmit rotation therebetween, and
means operable, each time the rotation of said shank is reversed, to hold said friction pad and said activating ring against rotation until said shank has rotated a predetermined distance relative to said activating ring.

11. A tool as defined in claim 10, wherein said holding means comprises a conical surface formed on said pad around the outside of said sleeve for engagement with a workpiece to stop rotation of said pad and said ring.

12. A tool as defined in claim 10 wherein said holding means comprises an external, conical surface integral with said sleeve at one end thereof, and engageable with a workpiece to stop rotation of said sleeve, said pad and said ring.

13. A tool as defined in claim 10, wherein said holding means comprises a plurality of resilient pads carried in the outer peripheral surface of said sleeve for frictional engagement with the bore wall of a workpiece to halt rotation of said sleeve, said pad and said ring.

14. A counterboring tool having a shank attachable to a reversably rotatable and axially reciprocable spindle for rotation and axial movement thereby, a cutter holder carried by said shank and pivotal thereon about an axis parallel to but offset from the axis of rotation of said shank, a cutter secured to said holder to move therewith, means normally connecting said cutter holder to said shank so that said cutter holder and shank rotate together, means operatively connected to said holder to engage a workpiece to hold the holder frictionally against rotation with said shank upon engagement of said means with the workpiece, thereby to swing said cutter about said offset axis to and from operative positions, depending upon the direction of rotation of the shank when said friction holding means engages the workpiece, and means for limiting the amount of pivotal movement in both directions of said holder relative to said shank.

15. A counterboring tool as claimed in claim 14, wherein said cutter is a double-edge cutter with one edge disposed above the other, said frictional holding means is disposed below said cutter, second frictional holding means is disposed above said cutter, means connects said second frictional holding means to said shank normally to rotate therewith, and said second frictional holding means is a pilot sleeve rotatably mounted on said shank and adapted to be engaged frictionally with a bore of the workpiece to hold said sleeve against rotation with said shank upon engagement of said shank within the bore, means connects said sleeve with said cutter holder to move said cutter holder and the cutter thereon to and from operative positions, depending upon the direction of rotation of said shank when said sleeve is in engagement with the bore.

* * * * *